United States Patent
Reggiannini et al.

(10) Patent No.: US 12,506,508 B2
(45) Date of Patent: Dec. 23, 2025

(54) CALIBRATION OF DAC IMAGES FOR IMPROVED TRANSMIT QUADRATURE ERROR CORRECTION

(71) Applicant: Analog Devices, Inc., Wilmington, MA (US)

(72) Inventors: Brian Reggiannini, Norwood, MA (US); Aleksey Kagan, Raleigh, NC (US)

(73) Assignee: Analog Devices, Inc., Wilmington, MA (US)

(*) Notice: Subject to any disclaimer, the term of this patent is extended or adjusted under 35 U.S.C. 154(b) by 50 days.

(21) Appl. No.: 18/417,969

(22) Filed: Jan. 19, 2024

(65) Prior Publication Data

US 2025/0240046 A1    Jul. 24, 2025

(51) Int. Cl.
*H04B 1/40* (2015.01)
*H04B 17/12* (2015.01)

(52) U.S. Cl.
CPC ............. *H04B 1/40* (2013.01); *H04B 17/12* (2015.01)

(58) Field of Classification Search
CPC . H04B 1/38; H04B 1/40; H04B 17/11; H04B 17/12; H04B 17/13; H04L 27/02; H04L 27/04; H04L 27/20
USPC ....... 375/219, 225, 227, 261, 270, 279–281, 375/295–298, 301; 370/278, 282; 455/67.13, 69, 70, 73, 77, 109, 114.3, 455/115.1
See application file for complete search history.

(56) References Cited

U.S. PATENT DOCUMENTS

| | | | |
|---|---|---|---|
| 2013/0308693 A1* | 11/2013 | Li | H04W 24/02 375/224 |
| 2016/0056764 A1* | 2/2016 | Tham | H04B 1/04 327/355 |
| 2018/0124616 A1* | 5/2018 | Jiang | H04W 24/08 |
| 2020/0177420 A1* | 6/2020 | Yang | H04L 27/148 |
| 2024/0162921 A1* | 5/2024 | Chakraborty | H04B 1/0028 |

FOREIGN PATENT DOCUMENTS

CN           100411312 C  *  8/2008

* cited by examiner

*Primary Examiner* — Young T. Tse
(74) *Attorney, Agent, or Firm* — Schwegman Lundberg & Woessner, P.A.

(57) ABSTRACT

A method of operating a radio frequency (RF) transceiver includes transmitting a narrowband calibration signal using a transmit channel of the RF transceiver, wherein a transmitted output signal includes a sideband of the calibration signal and a sideband of a digital-to-analog converter (DAC) image signal produced by DAC circuitry of the transmit channel; sampling the transmitted output signal using an analog-to-digital converter (ADC) circuit; filtering the transmitted output signal sampled by the ADC circuit to reduce power of the sideband of the calibration signal; attenuating DAC signals produced by the DAC circuitry to reduce power of the sideband of the DAC image signal; restoring the power of the sideband of the calibration signal sampled by the ADC circuit; and performing quadrature error correction (QEC) using the output of the ADC circuit.

20 Claims, 4 Drawing Sheets

CALIBRATION OF DAC IMAGES FOR IMPROVED TRANSMIT QUADRATURE ERROR CORRECTION

FIELD OF THE DISCLOSURE

This document pertains generally, but not by way of limitation, to radio frequency (RF) transceivers, and more particularly, to circuits and methods for improving quadrature error correction (QEC) of transmitted RF signals.

BACKGROUND

Radio transceivers can broadcast broadband quadrature signals from in-phase and quadrature (I/Q) input signals. Mismatch in gain and phase between the I/Q signals can result in undesired image signal components, such as sideband image signals of the desired signal, which can cause interference in the transmit signal. Quadrature Error Correction (QEC) is used in radio transceivers to reduce image signal components.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
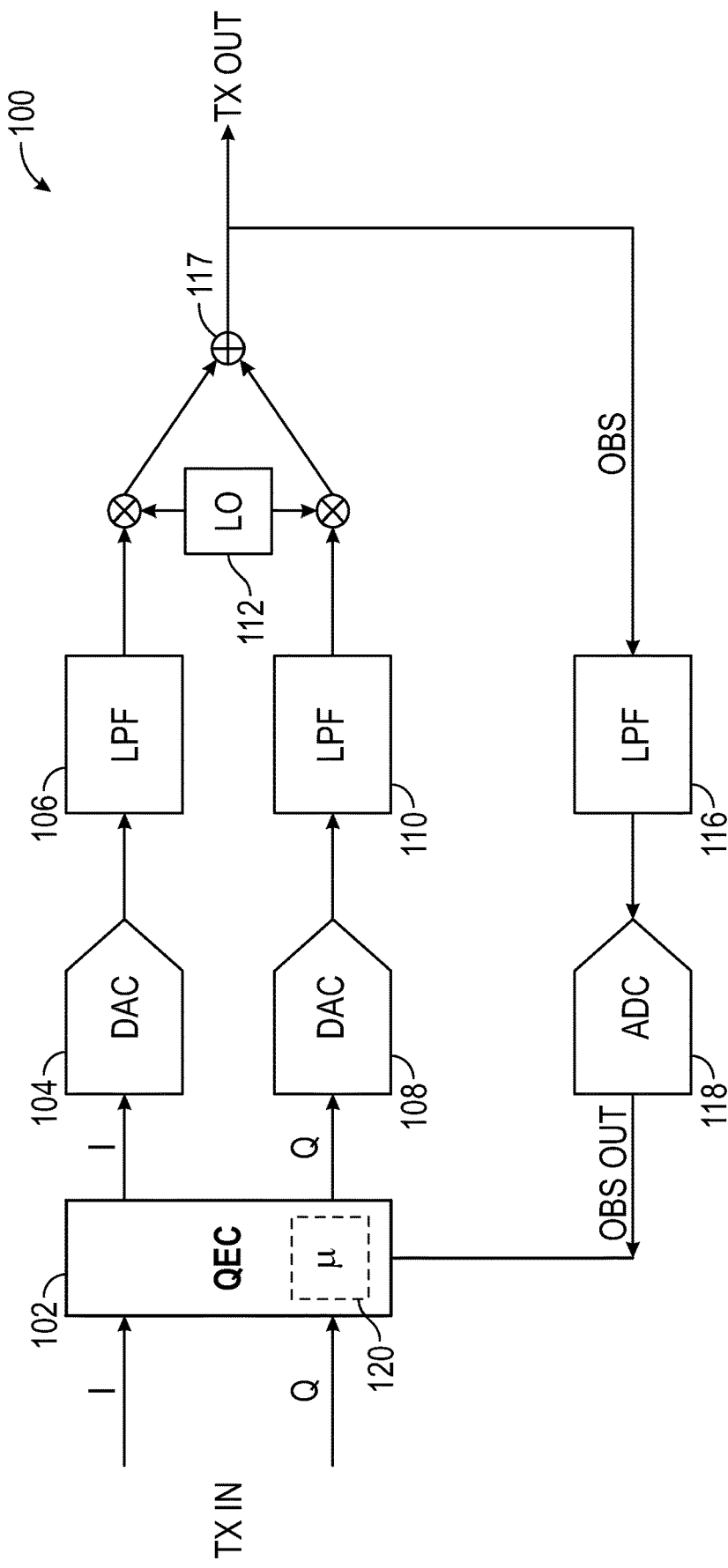
FIG. 1 is a block diagram of an example of a calibration subsystem of a radio frequency (RF) transceiver.

FIG. 1 is a block diagram of an example of a calibration subsystem 100 of a Radio Frequency (RF) transceiver. The RF transceiver may transmit signals with frequencies in the microwave range. The calibration subsystem 100 provides Quadrature Error Correction (QEC) of transmitted RF signals. The RF transmitter is a Zero Intermediate Frequency (Zero IF) transmitter. The calibration subsystem 100 includes a transmit (TX) channel and an RF observation (OBS) channel connected to the output of the transmit channel. The transmit channel includes QEC circuitry 102, an In-phase signal path (I-path) and a quadrature signal path (Q-path). The I-path includes a I-path Digital-to-Analog Converter circuit (I-path DAC circuit 104) and a low pass filter (LPF) circuit 106 that may be a tunable low pass filter circuit. The Q-path includes a Q-path DAC circuit 108 and another low pass filter circuit 110 that also may be a tunable low pass filter circuit. A local oscillator (LO) circuit 112 upconverts the I signals and Q signals for summing at the output of the transmitter path.

The RF observation (OBS) channel includes a tunable filter circuit 116 and an observation Analog-to-Digital Converter circuit (ADC circuit 118). The output of the observation channel (OBS OUT) is used by the QEC circuitry 102 to reduce image signals in the transmitted output signal. The QEC circuitry 102 can include a digital actuator and a correlation engine that are included in digital hardware. The digital actuator operates in real time and pre-distorts the I and Q signals. The correlation engine compares the input signal (TX IN) to OBS OUT and extracts a set of sufficient statistics. The QEC circuitry 102 may also include a microcontroller 120 that interprets the sufficient statistics, updates the digital actuator, and performs a QEC algorithm to reduce image signals. The ADC circuit 118 samples the transmitted signal (TX OUT) after the upconverting by the LO circuit 112 and summing 117.

When the transmit channel DAC circuitry and observation ADC circuit 118 operate at sampling rates that are related by a rational fraction, a subset of image signals from the DACs alias coherently and undesirably within the ADC circuit 118 resulting in undesired sideband DAC image signals (USB-DAC). This results in a signal observed by the ADC circuit 118 consisting of a sum of the desired transmit signal (DES) and subset of DAC images of the desired signal. This reduces the ability of the ADC circuit 118 to provide an isolated desired transmit signal to the QEC algorithm.

The output signal observed by the ADC circuit 118 also includes an undesired sideband (USB) of the desired signal (or USB-DES). The USB-DES in the transmit response can be caused by an imbalance between the gain and phase of the I-path and the Q-path. The QEC algorithm attempts to estimate the imbalances between the I-path and the Q-path using the observation channel to observe the transmitted signal (TX OUT), and then correct the estimated imbalances. In some examples, the QEC algorithm inserts one or both of a pre-corrected I signal and Q signal to pre-compensate for the estimated imbalance in the I-path and Q-path of the transmitter.

However, because of the relationship between the sampling rate of the ADC circuit 118 and the sampling rate of the DAC circuitry, the QEC algorithm observes and corrects the sum of the USB-DES and the USB-DAC signals, rather than just the correcting the USB-DES as intended. To improve the rejection of the USB-DES, the USB-DAC signals should be reduced.

Figure 2:
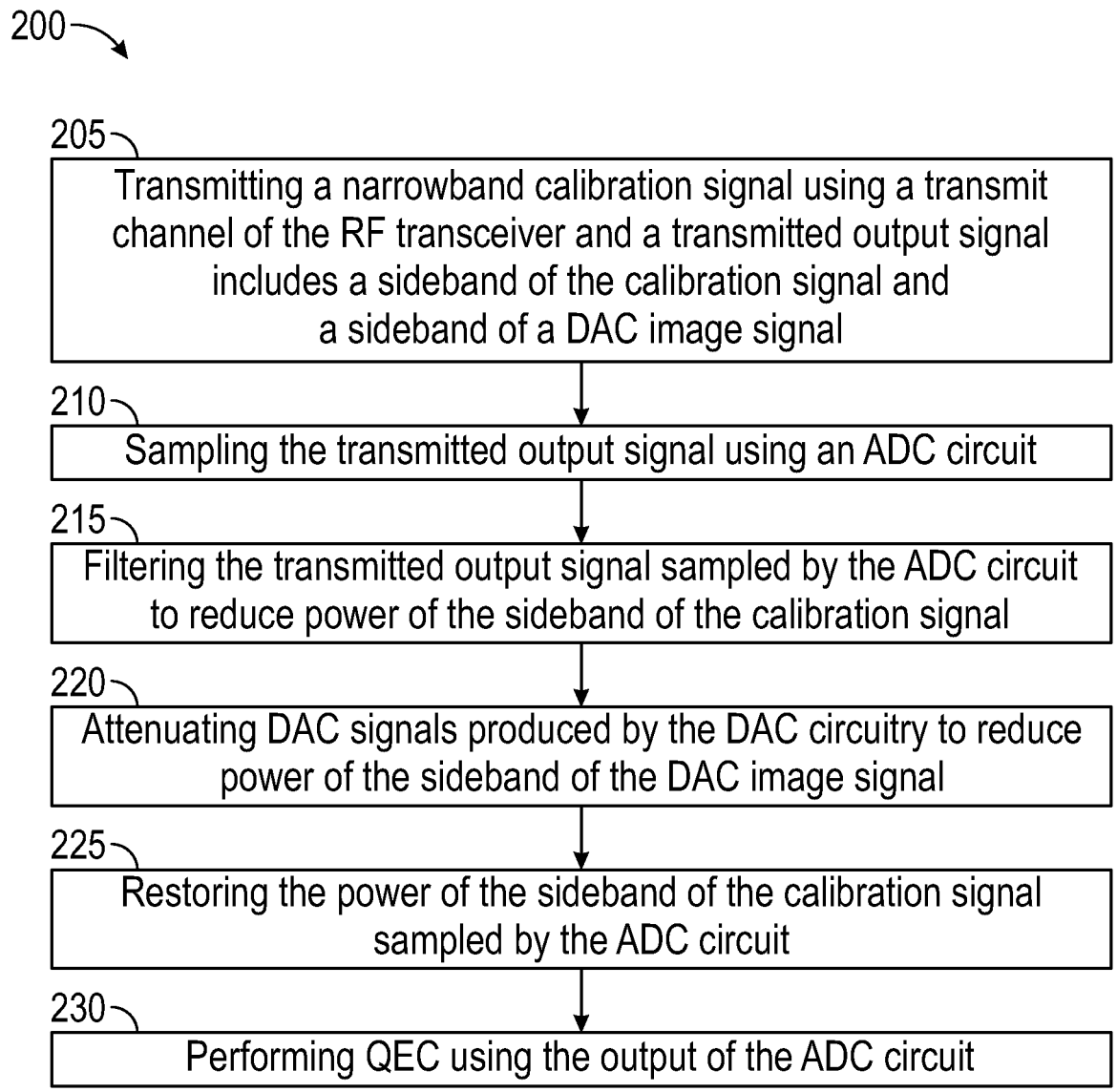
FIG. 2 is a flow diagram of an example of a method of operating an RF transceiver.

FIG. 2 is a flow diagram of an example of a method 200 of operating an RF transceiver. The method 200 calibrates the QEC of the RF transceiver to reduce the sideband images of the desired signal. The method may be performed by the calibration subsystem 100 of FIG. 1. As explained previously herein, the QEC algorithm will see an observed output signal that includes the sum of the USB-DES signal and the USB-DAC signals, which reduces the ability of the QEC algorithm to correct the undesired sideband signal components. The method 200 uses signal processing to accentuate the USB-DAC signals relative to the USB-DES signals. The exposed DAC image signals are then reduced independently without significantly affecting the USB-DES signal and the DES signal. The QEC algorithm is then better able to detect and reduce USB-DES signals and improve transmitting of the DES signal.

At block 205, the microcontroller 120 transmits a narrowband calibration signal using the transmit channel of the RF transceiver. In some examples, the narrowband calibration signal is an RF tone signal having a tone frequency. The microcontroller 120 provides a digital version of the signal to the QEC circuitry 102, which provides the digital I/Q signals to the I-path DAC 104 and Q-path DAC 108.

Figure 3A:
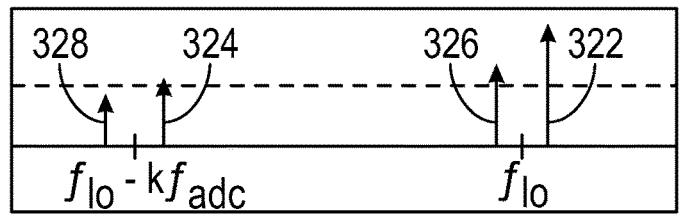
FIGS. 3A-3E are graphs in the frequency domain of an example of the signal components of an output signal transmit by an RF transceiver.

At block 210, the transmitted calibration signal is sampled using the ADC circuit 118. FIGS. 3A-3E show the signal components of the transmitted output signal (TX OUT) seen at the input of the observation ADC circuit 118 in the frequency domain. The frequency $f_{LO}$ is the local oscillator frequency and $f_{ADC}$ is the frequency of the ADC sampling. FIG. 3A shows the desired calibration signal 322 (DES) that it is desired to transmit, and a DAC image signal 324 that is a subset of the DAC image signal components produced by the DAC circuitry. The DES signal 322 is located at $f_{LO}+f_{BB}$, where $f_{BB}$ is the baseband frequency offset of the narrowband calibration signal. The DAC image signals 324 include any energy at frequencies $f_{LO}-k*f_{ADC}+f_{BB}$, with "k" being any non-zero integer. FIG. 3A also shows that the transmitted output signal includes an undesired sideband of the desired calibration signal 326 (USB-DES) located at $f_{LO}-f_{BB}$, and an undesired sideband of the DAC image signal 328 (USB-DAC). A USB-DAC signal 328 includes any energy at frequencies $f_{LO}-f_{BB}+k*f_{ADC}$, with "k" being any non-zero integer. The USB-DAC signals 328 are caused by a combination of mismatch between the I and Q paths of the transmitter (i.e. differences in the gain/phase of the DAC images for the I-path DAC 104 vs. the Q-path DAC 108), as well as the purposeful transmission of these terms via the introduction of "anti-images" within the QEC actuator.

Figure 3B:
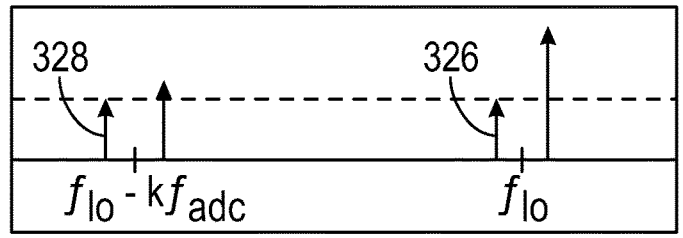

In FIG. 3B, the microcontroller 120 may optionally perform an initial QEC to reduce power of the USB-DES signal 326. Because of the aliasing in the ADC circuit 118, the QEC will correct the sum of the USB-DES signal 326 and the USB-DAC signal 328 and bring the USB-DES signal 326 and USB-DAC signal 328 to similar levels. FIG. 3B shows that the QEC results in the QEC corrected USB-DES signal 326 and corrected USB-DAC signal 328 having similar amplitude at the input to the ADC circuit 118.

Returning to FIG. 2 at block 215, the transmitted calibration signal (TX OUT in FIG. 1) sampled by the ADC circuit is filtered to reduce power of the USB-DES signal 326. In some examples, the filtering involves the microcontroller 120 tuning the tunable filter circuit 116 in the observation channel to have narrower bandwidth.

The tunable filter circuit 116 may be a tunable low pass filter circuit when the USB-DAC signal 328 is at a lower frequency than the USB-DES signal 326 as in the examples of FIG. 3A-3E. In other examples, the tunable filter circuit 116 may be a tunable high pass filter circuit in situations where the USB-DAC signal 328 is at a higher frequency than the USB-DES signal 326. In variations, the tunable filter circuit 116 is tunable to be either a high pass or a low pass filter.

Figure 3C:
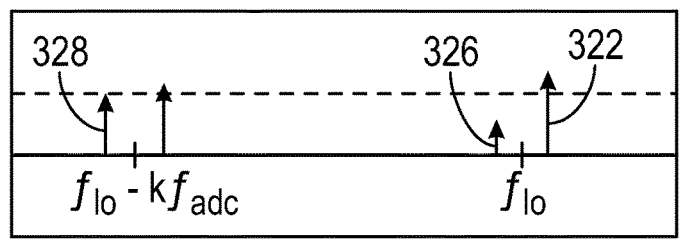

FIG. 3C shows that the narrower bandwidth results in the amplitude of the USB-DES signal 326 being attenuated more than the USB-DAC signal 328. This makes the USB-DAC signal 328 more observable to the QEC circuitry at the output of the ADC circuit 118. FIG. 3C shows that the amplitude of the desired calibration signal 322 (DES) is also attenuated.

At block 220, the DAC signals produced by the DAC circuitry are attenuated to reduce power of the USB-DAC signal 328. In some examples, the signals from the I-path DAC and the Q-path DAC are attenuated by filtering using the I-path low pass filter circuit 106 and the Q-path low pass filter circuit 110. The I-path low pass filter circuit 106 and the Q-path low pass filter circuit 110 may be tunable filter circuits. The corner frequency of the low pass filtering can be tuned by the microcontroller relative to the frequency of the USB-DAC signal 328 to reduce power of the USB-DAC signal 328.

Figure 4:
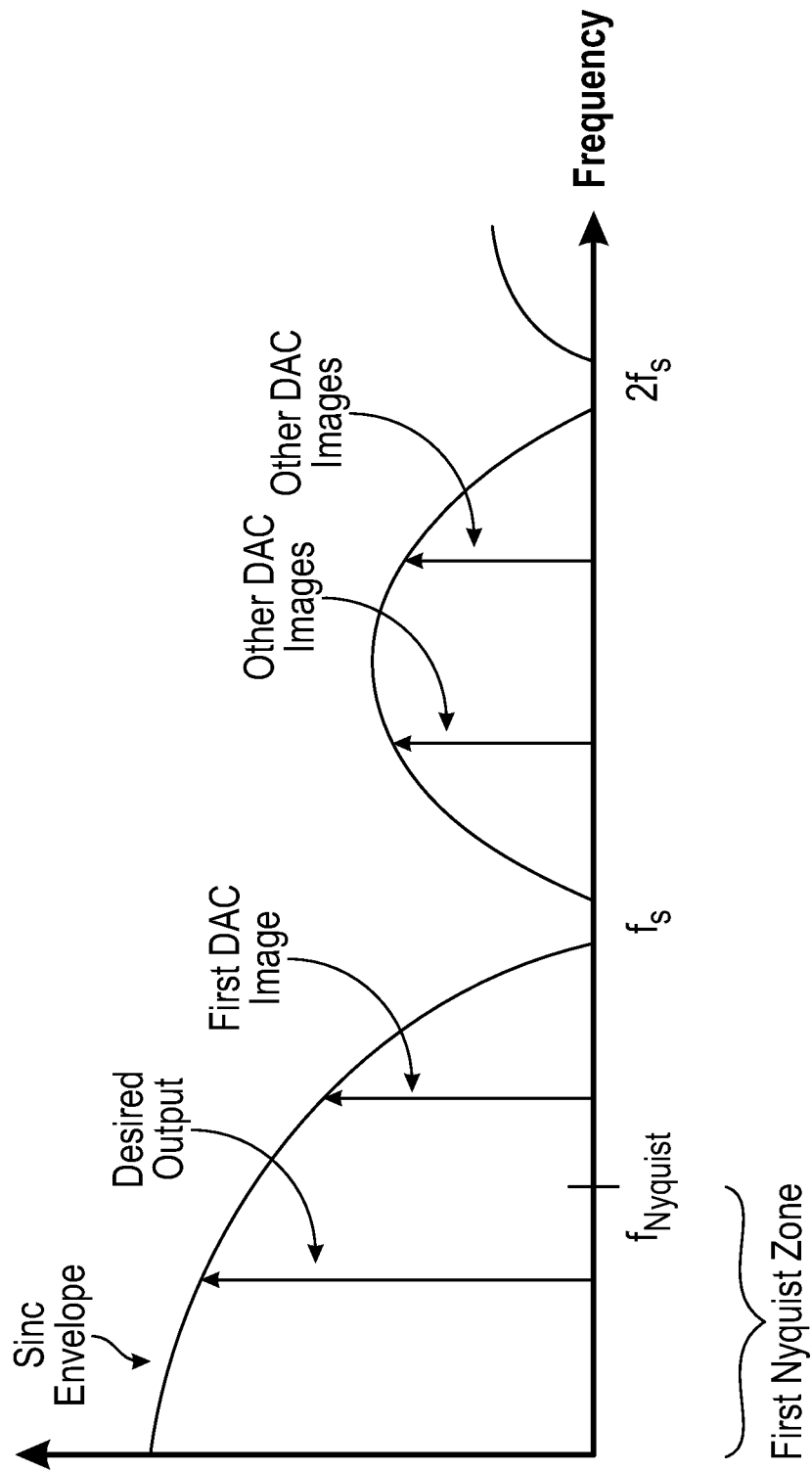
FIG. 4 is an illustration of a graph of an example of the sinc response of a digital-to-analog converter.

In some examples, the sinc response of one or both of the I-path DAC circuit 104 and the Q-path DAC circuit 108 are tuned to attenuate the DAC signals. FIG. 4 is an illustration of a graph of the sinc (sin(x)/x) response of a DAC (e.g., the I-path DAC circuit and the Q-path DAC circuit in FIG. 1) in the frequency domain. The graph shows that the sinc envelope of the response has nulls near multiples of the sampling frequency $f_S$. The graph also shows the desired output and DAC images. The sinc response of the DAC can be tuned by tuning the clocking of the DAC to adjust the gain and phase response of the DAC to move the response nulls toward the frequency of the USB-DAC signal 328 without significantly affecting the DAC response at the frequency of the DES signal 322.

Figure 3D:
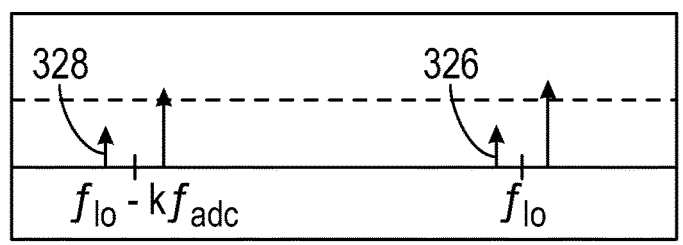

FIG. 3D shows the attenuation of the USB-DAC signal 328 due to the filtering at block 220. Whichever approach is used to attenuate the USB-DAC signal 328, the attenuation should independently attenuate the USB-DAC signal 328 without significantly affecting the amplitude of the USB-DES signal 326 and the DES signal 322. The idea is to make the USB-DES signal 326 to a more precise level by the QEC to improve the correction of the I/Q imbalance. Also, because the USB-DAC signal 328 is caused by variations in DAC images between the I-path DAC 104 and the Q-path DAC 108, the tuning of I-path and Q-path LPF circuits (106, 110) or the tuning of the sinc response of the DACs should be independently controllable to apply independent attenuation to the I-Path and Q-path.

Figure 3E:
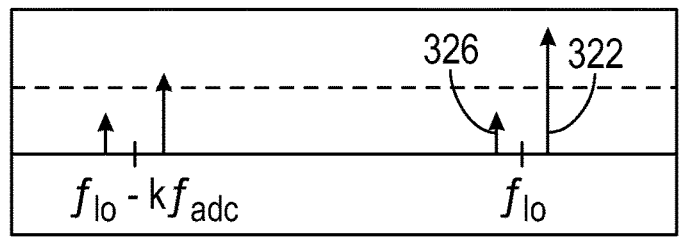

At block 225, the filtering of the transmitted output signal sampled by the ADC circuit 118 of the observation channel is removed. The attenuation in the I-path and Q-path of the transmit channel remains in place. In some examples, the microcontroller 120 tunes the tunable filter circuit 116 in the observation channel to the original wider bandwidth. This increases the power in the DES signal 322 and the USB-DES signal 326. The ADC circuit 118 samples the restored signal and, at block 230, QEC is performed using the output of the ADC circuit 118. The QEC can achieve better performance because the QEC is able to better identify the USB-DES signal 326 and attenuate the USB-DES signal 326 even further. FIG. 3E shows the restored DES signal 322 and attenuated USB-DES 326.

System and methods have been described for improving QEC for a Zero IF system in which the sampling rate of an observation ADC circuit has a sampling rate related to the sampling rate of transmit DAC circuitry by a rational fraction. An undesirable DAC image is identified using a tunable RF filter, and DAC tuning is used as a "knob" for independent correction of the I-path DAC and Q-path DAC gain and phase response at the frequency of the DAC image without significantly affecting the desired DAC response at the frequency of the desired output signal.

Additional Description and Examples

Example 1 includes subject matter (such as a method of operating a radio frequency (RF) transceiver) comprising transmitting a narrowband calibration signal using a transmit channel of the RF transceiver, wherein a transmitted output signal includes a sideband of the calibration signal and a sideband of a digital-to-analog converter (DAC) image signal produced by DAC circuitry of the transmit channel; sampling the transmitted output signal using an analog-to-digital converter (ADC) circuit; filtering the transmitted output signal sampled by the ADC circuit to reduce power of the sideband of the calibration signal; attenuating DAC signals produced by the DAC circuitry to reduce power of the sideband of the DAC image signal; restoring the power of the sideband of the calibration signal sampled by the ADC circuit; and performing quadrature error correction (QEC) using output of the ADC circuit.

In Example 2, the subject matter of Example 1 optionally includes filtering the transmitted output signal using a tunable low pass filter circuit when the sideband of the DAC image signal is at a lower frequency than the sideband of the calibration signal, and filtering the transmitted output signal using a tunable high pass filter circuit when the sideband of the DAC image signal is at a higher frequency than the sideband of the calibration signal.

In Example 3, the subject matter of one or both of Examples 1 and 2 optionally includes performing additional QEC to reduce power of the sideband of the calibration signal before the filtering of the transmitted output signal sampled by the ADC circuit.

In Example 4, the subject matter of one or any combination of Examples 1-3 optionally includes transmitting the calibration signal using a transmit channel that includes an in-phase circuit path (I-path) DAC and a quadrature circuit path (Q-path) DAC, and filtering the outputs of the I-path DAC and the Q-path DAC using tunable channel filter circuits to reduce power of the sideband of the DAC image signal.

In Example 5, the subject matter of one or any combination of Examples 1-4 optionally includes transmitting the calibration signal using a transmit channel that includes an in-phase circuit path (I-path) DAC and a quadrature circuit path (Q-path) DAC, and tuning a sinc response of one or both of the I-path DAC and the Q-path DAC to reduce power of the sideband of the DAC image signal.

In Example 6, the subject matter of one or any combination of Examples 1-5 optionally includes sampling the transmitted output signal using an ADC circuit having a sampling rate related to a sampling rate of the DAC circuitry by a rational fraction.

In Example 7, the subject matter of one or any combination of Examples 1-6 optionally includes transmitting a tone signal as the narrowband calibration signal.

In Example 8, the subject matter of one or any combination of Examples 1-7 optionally includes sampling the transmitted output signal after upconverting the narrowband calibration signal using a local oscillator.

Example 9 includes subject matter (such as a transmitter circuit for an RF transceiver) or can optionally be combined with one or any combination of the Examples 1-8 to include such a subject matter, comprising a transmit channel including quadrature error correction (QEC) circuitry and digital-to-analog converter (DAC) circuitry, an analog-to-digital converter (ADC) circuit configured to sample an output signal of the transmit channel, a first tunable filter circuit coupled to the output of the transmit channel and an input of the ADC circuit, and a microcontroller. The microcontroller is configured to transmit a narrowband calibration signal, wherein a transmitted output signal includes a sideband of the calibration signal and a sideband of a DAC image signal produced by the DAC circuitry, tune the first tunable filter circuit to reduce power of the sideband of the calibration signal, tune the DAC signals produced by the DAC circuitry to reduce power of the sideband of the DAC image signal, and tune the first tunable filter to restore the power of the sideband of the calibration signal. The QEC circuitry performs QEC of the output signal using the output of the ADC circuit.

In Example 10, the subject matter of Example 9 optionally includes a microcontroller configured to tune low pass filtering of the first tunable filter circuit when the when the sideband of the DAC image signal is at a lower frequency than the sideband of the calibration signal, and tune high pass filtering of the of the first tunable filter circuit when the sideband of the DAC image signal is at a higher frequency than the sideband of the calibration signal.

In Example 11, the subject matter of one or both of Examples 9 and 10 optionally includes QEC circuitry configured to perform QEC to reduce power of the sideband of the calibration signal before the tuning of the first tunable filter circuit.

In Example 12, the subject matter of one or any combination of Examples 9-11 optionally includes DAC circuitry including an in-phase circuit path (I-path) DAC and a quadrature circuit path (Q-path) DAC, a transmit channel that includes a second tunable filter circuit at the output of the I-path DAC and a third tunable filter circuit at the output of the Q-path DAC, and a microcontroller configured to tune the DAC signals by tuning the filtering of the second and third tunable filter circuits.

In Example 13, the subject matter of one or any combination of Examples 9-11 optionally includes DAC circuitry including an in-phase circuit path (I-path) DAC and a quadrature circuit path (Q-path) DAC, and a microcontroller configured to tune the DAC signals by tuning a sinc response of one or both of the I-path DAC and Q-path DAC.

In Example 14, the subject matter of one or any combination of Examples 9-13 optionally includes an ADC circuit having a sampling rate related by a rational fraction to a sampling rate of the DAC circuitry.

In Example 15, the subject matter of one or any combination of Examples 9-14 optionally includes a microcontroller configured to transmit a tone signal as the narrowband calibration signal.

In Example 16, the subject matter of one or any combination of Examples 9-15 optionally includes a local oscillator circuit configured to upconvert the DAC signals and an observe signal path connected to an output of the local oscillator circuit, and wherein the observation channel includes the first tunable filter and the ADC.

Example 17 includes subject matter (such as a calibration system for a zero intermediate frequency (Zero IF) microwave transmitter) or can optionally be combined with one or any combination of Examples 1-16 to include such subject matter, comprising a transmit channel including an in-phase signal path (I-path) digital-to-analog converter (DAC) circuit and a quadrature signal path (Q-path) DAC circuit, an observation channel including an analog-to-digital converter (ADC) circuit and a tunable filter circuit operatively coupled to an output of the DAC circuit, and a microcontroller. The microcontroller is configured to transmit a radio frequency (RF) tone signal using the transmit channel, observe a sideband of the tone signal and a sideband of a DAC image signal of one or both of the I-path DAC circuit and the Q-path DAC circuit, tune the tunable filter circuit to filter the sideband of the RF tone signal and detect the sideband of the DAC image signal, tune a sinc response of one or both of the I-path DAC and the Q-path DAC to reduce power of the sideband of the DAC image signal, remove the filtering of the sideband of the RF tone signal by the tunable filter circuit, and perform quadrature error correction (QEC) using the sideband of the RF tone signal.

In Example 18, the subject matter of Example 17 optionally includes a microcontroller configured to initiate QEC before tuning of the tunable filter, and initiate QEC after tuning the sinc response of the one or both of the I-path DAC and the Q-path DAC.

In Example 19, the subject matter of one or both of Examples 17 and 18 optionally includes the ADC circuit having a sampling rate related to a sampling rate of the I-path DAC circuit and the Q-path DAC circuit by a rational fraction.

In Example 20, the subject matter of one or any combination of Examples 17-19 optionally includes a microcontroller configured to narrow a bandwidth of the tunable filter circuit to reduce power of the sideband of the RF tone signal.

These non-limiting Examples can be combined in any permutation or combination. The above detailed description includes references to the accompanying drawings, which form a part of the detailed description. The drawings show, by way of illustration, specific embodiments in which the invention can be practiced. These embodiments are also referred to herein as "examples." All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable differences, the usage in this document controls.

What is claimed is:

1. A method of operating a radio frequency (RF) transceiver, the method comprising:
   transmitting, using a transmit channel of the RF transceiver, a narrowband calibration signal, wherein a transmitted output signal includes a sideband of the narrowband calibration signal and a sideband of a digital-to-analog converter (DAC) image signal produced by DAC circuitry of the transmit channel;
   inputting the transmitted output signal to an analog-to-digital converter (ADC) circuit of an observational channel of the RF transceiver;
   filtering the transmitted output signal input to the ADC circuit to reduce power of the sideband of the narrowband calibration signal at the input of the ADC circuit more than power of the sideband of the DAC image signal is reduced at the input of the ADC circuit;
   attenuating DAC signals produced by the DAC circuitry to reduce power of the sideband of the DAC image signal;
   restoring the power of the sideband of the narrowband calibration signal input to the ADC circuit; and
   performing quadrature error correction (QEC) using output of the ADC circuit.

2. The method of claim 1, wherein the filtering the transmitted output signal input to the ADC circuit includes filtering the transmitted output signal using a tunable low pass filter circuit when the sideband of the DAC image signal is at a lower frequency than the sideband of the narrowband calibration signal, and filtering the transmitted output signal using a tunable high pass filter circuit when the sideband of the DAC image signal is at a higher frequency than the sideband of the narrowband calibration signal.

3. The method of claim 1, further comprising:
   tuning the filtering of the transmitted output signal input to the ADC circuit; and
   performing additional QEC to reduce power of the sideband of the narrowband calibration signal before the tuning the filtering of the transmitted output signal sampled by the ADC circuit.

4. The method of claim 1,
   wherein the transmitting the narrowband calibration signal includes transmitting the narrowband calibration signal using the transmit channel that includes an in-phase circuit path (I-path) DAC and a quadrature circuit path (Q-path) DAC; and
   wherein the attenuating the DAC signals of the DAC circuitry includes filtering the outputs of the I-path DAC and the Q-path DAC using tunable channel filter circuits to reduce power of the sideband of the DAC image signal.

5. The method of claim 1,
   wherein the transmitting the narrowband calibration signal includes transmitting the narrowband calibration signal using the transmit channel that includes an in-phase circuit path (I-path) DAC and a quadrature circuit path (Q-path) DAC; and
   wherein the attenuating the DAC signals of the DAC circuitry includes tuning a sinc response of one or both of the I-path DAC and the Q-path DAC to reduce power of the sideband of the DAC image signal.

6. The method of claim 1, wherein the inputting the transmitted output signal to the ADC circuit includes sampling the transmitted output signal with the ADC circuit with a sampling rate related to a sampling rate of the DAC circuitry by a rational fraction.

7. The method of claim 1, wherein the transmitting the narrowband calibration signal includes transmitting a tone signal.

8. The method of claim 1, wherein the inputting the transmitted output signal to the ADC circuit includes sampling the transmitted output signal after upconverting the narrowband calibration signal using a local oscillator.

9. A radio frequency (RF) transceiver, comprising:
   a transmit channel including quadrature error correction (QEC) circuitry and digital-to-analog converter (DAC) circuitry;
   an observation channel including an analog-to-digital converter (ADC) circuit and a first tunable filter circuit coupled to an output of the transmit channel and an input of the ADC circuit; and
   a microcontroller configured to:
   transmit a narrowband calibration signal, wherein a transmitted output signal of the transmit channel includes a sideband of the narrowband calibration signal and a sideband of a DAC image signal produced by the DAC circuitry;
   tune the first tunable filter circuit to reduce power of the sideband of the narrowband calibration signal input to the ADC circuit;
   tune DAC signals produced by the DAC circuitry to reduce power of the sideband of the DAC image signal input to the ADC circuit, wherein the power of the sideband of the narrowband calibration signal input to the ADC circuit is reduced more than the power of the sideband of the DAC image signal input to the ADC circuit is reduced;
   tune the first tunable filter to restore the power of the sideband of the narrowband calibration signal; and
   wherein the QEC circuitry performs QEC of an output signal of the ADC circuit.

10. The RF transceiver of claim 9, wherein the microcontroller is further configured to tune low pass filtering of the first tunable filter circuit when the sideband of the DAC image signal is at a lower frequency than the sideband of the narrowband calibration signal, and tune high pass filtering of the first tunable filter circuit when the sideband of the DAC image signal is at a higher frequency than the sideband of the narrowband calibration signal.

11. The RF transceiver of claim 9, wherein the QEC circuitry is configured to perform the QEC to reduce power of the sideband of the narrowband calibration signal before the tuning of the first tunable filter circuit.

12. The RF transceiver of claim 9,
wherein the DAC circuitry includes an in-phase circuit path (I-path) DAC and a quadrature circuit path (Q-path) DAC;
wherein the transmit channel further includes a second tunable filter circuit configured to filter an output of the I-path DAC and a third tunable filter circuit configured to filter an output of the Q-path DAC; and
wherein the microcontroller is configured to tune the DAC signals by tuning the filtering of the second and third tunable filter circuits.

13. The RF transceiver of claim 9,
wherein the DAC circuitry includes an in-phase circuit path (I-path) DAC and a quadrature circuit path (Q-path) DAC; and
wherein the microcontroller is configured to tune the DAC signals by tuning a sinc response of one or both of the I-path DAC and the Q-path DAC.

14. The RF transceiver of claim 9, wherein the ADC circuit includes a sampling rate related by a rational fraction to a sampling rate of the DAC circuitry.

15. The RF transceiver of claim 9, wherein the microcontroller is configured to transmit a tone signal as the narrowband calibration signal.

16. The RF transceiver of claim 9,
wherein the transmit channel further includes a local oscillator circuit configured to upconvert the DAC signals; and
wherein the first tunable filter circuit and the ADC circuit are included in an observe signal path of the observation channel coupled to an output of the local oscillator circuit.

17. A calibration system for a zero intermediate frequency (Zero IF) microwave transmitter, the calibration system comprising:

a transmit channel including an in-phase signal path (I-path) digital-to-analog converter (DAC) circuit and a quadrature signal path (Q-path) DAC circuit;
an observation channel coupled to the transmit channel and including an analog-to-digital converter (ADC) circuit and a tunable filter circuit; and
a microcontroller configured to:
transmit a radio frequency (RF) tone signal using the transmit channel;
observe a sideband of the RF tone signal and a sideband of a DAC image signal of one or both of the I-path DAC circuit and the Q-path DAC circuit;
tune the tunable filter circuit to filter and attenuate the sideband of the RF tone signal more than the sideband of the DAC image signal is attenuated and detect the sideband of the DAC image signal;
tune a sinc response of one or both of the I-path DAC circuit and the Q-path DAC circuit to reduce power of the sideband of the DAC image signal;
remove the filtering of the sideband of the RF tone signal by the tunable filter circuit; and
perform quadrature error correction (QEC) of the sideband of the RF tone signal.

18. The calibration system of claim 17, wherein the microcontroller is further configured to:
initiate QEC before tuning of the tunable filter circuit; and
initiate QEC after tuning the sinc response of the one or both of the I-path DAC circuit and the Q-path DAC circuit.

19. The calibration system of claim 17, wherein the ADC circuit includes a sampling rate related to a sampling rate of the I-path DAC circuit and the Q-path DAC circuit by a rational fraction.

20. The calibration system of claim 17, wherein the microcontroller is further configured to narrow a bandwidth of the tunable filter circuit to reduce power of the sideband of the RF tone signal.

* * * * *